United States Patent
Petzold et al.

(10) Patent No.: US 8,078,370 B2
(45) Date of Patent: Dec. 13, 2011

(54) HYDRAULIC OR PNEUMATIC CONTROL OF AN AUTOMATED SHIFT TRANSMISSION

(75) Inventors: Rainer Petzold, Friedrichshafen (DE); Mario Steinborn, Friedrichshafen (DE); Markus Deeg, Eberdingen (DE); Friedbert Roether, Cleebronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 415 days.

(21) Appl. No.: 12/438,278

(22) PCT Filed: Aug. 20, 2007

(86) PCT No.: PCT/EP2007/058609
§ 371 (c)(1),
(2), (4) Date: Feb. 20, 2009

(87) PCT Pub. No.: WO2008/025693
PCT Pub. Date: Mar. 6, 2008

(65) Prior Publication Data
US 2009/0319135 A1    Dec. 24, 2009

(30) Foreign Application Priority Data
Aug. 29, 2006   (DE) .................... 10 2006 040 476

(51) Int. Cl.
*G06F 19/00*    (2006.01)

(52) U.S. Cl. .......... 701/51; 477/150; 477/117; 477/158; 701/58; 701/62; 701/55

(58) Field of Classification Search .................. 477/150, 477/158, 117, 159, 162, 30, 156, 97; 701/58, 701/55, 51
See application file for complete search history.

(56) References Cited

U.S. PATENT DOCUMENTS

| 3,170,484 | A | 2/1965 | Benz et al. |
| 5,560,204 | A | 10/1996 | Ishihama et al. |
| 5,810,694 | A * | 9/1998 | Kamada et al. ................ 477/150 |
| 6,631,651 | B2 | 10/2003 | Petrzik |
| 6,705,175 | B1 | 3/2004 | Klatt |
| 2003/0033854 | A1 | 2/2003 | Klik et al. |
| 2006/0005647 | A1 | 1/2006 | Braford et al. |

FOREIGN PATENT DOCUMENTS

| DE | 1 295 383 | | 5/1969 |
| DE | 36 33 851 | A1 | 4/1988 |
| DE | 43 93 750 | T1 | 7/1995 |
| DE | 199 31 973 | A1 | 1/2001 |
| DE | 1 150 040 | A2 | 10/2001 |
| DE | 101 31 853 | A1 | 1/2003 |

* cited by examiner

Primary Examiner — Behrang Badii
(74) Attorney, Agent, or Firm — Davis & Bujold, P.L.L.C.

(57) ABSTRACT

A hydraulic or pneumatic control device for an automated shift transmission including actuating devices with actuating cylinders (15, 16) having pressure spaces (19a, 19b; 20a, 20b). The pressure spaces (19a, 19b; 20a, 20b) of the actuating cylinders (15, 16) can be connected by a respective control valve (22a, 22b; 32a, 32b) to a pressure line (26), which can be selectively connected to or cut off from a main pressure line (8) by a main shut-off valve (45a). At least one additional main shut-off valve (45b) is arranged in parallel with the first main shut-off valve (45a) between the main pressure line (8) and the pressure line (26) to improve the control characteristics and increase the operational reliability.

10 Claims, 3 Drawing Sheets

HYDRAULIC OR PNEUMATIC CONTROL OF AN AUTOMATED SHIFT TRANSMISSION

This application is a National Stage completion of PCT/EP2007/058609 filed Aug. 20, 2007, which claims priority from German patent application serial no. 10 2006 040 476.9 filed Aug. 29, 2006.

FIELD OF THE INVENTION

The invention concerns a hydraulic or pneumatic control device for an automated shift transmission, with at least two actuating devices each consisting of a double-action actuating cylinder having two pressure spaces separated by a piston, such that the pressure spaces of the actuating cylinder can each be connected selectively by a control valve to a pressure line or to an unpressurized line. The pressure line can be selectively connected to or cut off from a main pressure line by means of a main shut-off valve. The invention also concerns a method for controlling control elements of such a hydraulic or pneumatic control device.

BACKGROUND OF THE INVENTION

Control devices of the type indicated above, which work with a pressure medium such as hydraulic oil or compressed air, are known in various designs and are used with automated transmissions of motor vehicles to carry out gear changes. In passenger cars those control devices are usually hydraulic, whereas in contrast, in larger commercial vehicles such as trucks and buses, which have compressed air units, they mainly operate pneumatically.

Largely identical designs of such a control device are described for example in DE 199 31 973 A1 and in DE 101 31 853 A1. There, in each case a pump is provided by which a pressure medium can be drawn from a storage reservoir or oil sump and conveyed to a main pressure line. By means of a main shut-off valve, made as a 2/2-way magnetic switching valve, a pressure line can be selectively connected to, or disconnected from the main pressure line. To this pressure line are connected a plurality of control valves in the form of 3/2-way magnetic switching valves, which are associated in pairs with a respective actuating device. The actuating devices are each made as a double-action actuating cylinder with two pressure spaces separated by a piston, and the pressure spaces are in each case connected by a connection line to one of the associated control valves, by means of which they can be connected selectively to the pressure line or to an unpressurized line.

Depending on the structure of the transmission-internal shift actuating device, the actuating devices may have the function of a selector control element for selecting one among several shift gates, or of a gear control element for engaging and disengaging the gears of a shift gate concerned, or they may function exclusively as a gear control element. If the shift actuation is effected by an axially displaceable and rotatable shifting shaft, an actuating device that works as a selector control element is needed, by means of which, to select the shift gate, the shifting shaft can be manipulated into form-fitting engagement with the gearshift rod of the shift gate concerned, for example by means of a shift finger. Then, by virtue of another shift actuating device that acts as a shift control element, the associated gear is engaged and disengaged by the shifting shaft by axial displacement of the gearshift rod, which is engaged with an operating sleeve via a shifting fork.

It is also possible, however, for the gearshift rods or shift rockers to be actuated directly, in each case by an associated actuating device. In this case all the actuating devices act as gear control elements, and the shift gate is selected exclusively by actuating the gear control elements. In such a case the number of actuating devices needed corresponds to the number of shift gates, so in a simple automated shift transmission with six forward gears and one reverse gear at least four actuating devices are needed.

Starting from the last-mentioned example of a simple automated shift transmission with gearshift rods or shift rockers that can be actuated directly by the actuating devices, there are gearshifts which need a larger, and ones which need a smaller amount of pressure medium. In a gearshift between two gears associated with the same shift gate, i.e. which are engaged or disengaged by the same shifting rod or shift rocker, only one actuating device is used so the demand for pressure medium is only relatively small.

In contrast, if a shift takes place between two gears associated with different shift gates, i.e. which are engaged and disengaged by different shifting rods or shift rockers, then two actuating devices are used so the demand for pressure medium is greater. The pressure medium demand is even greater still in a so-termed multiple shift during which a plurality of successive gearshifts take place at short intervals.

The main shut-off valve is now required, during shift pauses, to cut off the pressure line with its connected control valves and the actuating devices from the main pressure line when in its closed condition. This then protects the control valves and actuating devices from the relatively high main pressure in the main pressure line, whereby otherwise possible leakage losses and perhaps also undesired movements of the actuating devices are avoided.

On the other hand, during shift phases the main shut-off valve is opened and the pressure line is therefore connected to the main pressure line in order to provide the control valves and the actuating devices to be operated by them with a sufficiently high pressure and a large enough volume flow. Consequently, the main shut-off valve is designed for a volume flow which, having regard to leaks that result from wear, corresponds to the maximum volume flow that can be required during a shift process. Thus, the main shut-off valve is usually of relatively large size and is consequently comparatively expensive and prone to malfunction; because of marked hysteresis its control properties are poor and when configured, as is usual, as a magnetic switching valve, it demands a relatively high control current. Furthermore, a malfunction of the main shut-off valve causes a failure of the entire control system and the associated shift transmission can no longer carry out gearshifts.

To avoid these disadvantages, at least in part, it is also known, instead of one large magnetic switching valve, to adopt a so-termed booster arrangement in which a correspondingly large, pressure-controlled main shut-off valve is positioned between the main pressure line and the pressure line, which can be acted upon with a control pressure via a smaller, interposed valve made as a magnetic switching valve and connected to the main pressure line. Owing to the rapid response behavior of and the low control current needed by this interposed valve, the controllability of this valve arrangement is at least partially improved. However, since two valves are needed this arrangement costs more and its operational reliability is to say the least not improved, since now only one defect in either one of the two valves, the pressure-controlled main shut-off valve or the electrically controlled interposed valve, can lead to failure of the control system.

SUMMARY OF THE INVENTION

Accordingly, the purpose of the invention is to propose a control device of the type described to begin with, by virtue of which a simple and inexpensive structure has better control properties and greater operational reliability. In addition, a method for actuating the control elements of such a control device is indicated.

These objectives are achieved by a hydraulic or pneumatic control device for an automated shift transmission, comprising actuating devices with actuating cylinders having pressure chambers, such that each pressure chamber of an actuating cylinder can be connected by a control valve to a pressure line and the pressure line can be selectively connected to or cut off from a main pressure line by means of a main shut-off valve. According to the invention, with this control device it is also provided that at least one further main shut-off valve is arranged in parallel with the first main shut-off valve between the main pressure line and the pressure line.

By virtue of this structure the at least two main shut-off valves can both be small, and because of the more rapid response behavior of these main shut-off valves the controllability of the control device is improved. Moreover the operational reliability of the control device is substantially increased, since if one of the main shut-off valves malfunctions the continuing functionality of the control device is ensured by the remaining, fault-free main shut-off valve, even though with somewhat restricted dynamics.

All the main shut-off valves are made as directly actuated 2/2-way magnetic switching valves, and can therefore be controlled directly, also being available inexpensively.

Likewise, it is expedient for all the main shut-off valves to be of identical structure, which makes for favorable purchase and logistics costs. Moreover, this simplifies the control of the main shut-off valves since they can all be controlled in accordance with the same characteristics.

It is also advantageous for the main shut-off valves to be controlled independently of one another by an associated control unit, since the main shut-off valves can then be controlled individually, for example as a function of the pressure medium demand at the time.

For this purpose it is also advantageous for the main shut-off valves to be of a size such that a maximum possible pressure medium demand can be covered by opening all and a smaller pressure medium demand can be covered by opening only one of the main shut-off valves.

To enable demand-related control of the main shut-off valves a pressure sensor connected to the pressure line can be used, by means of which the pressure p_dls and/or the pressure gradient (dp/dt)_dls in the pressure line can be determined.

The second objective is achieved by a method for actuating control elements of a hydraulic or a pneumatic control device of an automated shift transmission, which comprises actuating devices with actuating cylinders having pressure spaces, such that the pressure spaces of the actuating cylinders can each be connected via a control valve to a pressure line and the pressure line can be selectively connected to a main pressure line or cut off therefrom by means of a main shut-off valve. The method provides that if a plurality of main shut-off valves are arranged in parallel between the main pressure line and the pressure line, the pressure medium demand of the actuating devices and the associated control valves is determined and the main shut-off valves are controlled as a function of the pressure medium demand determined.

For this purpose it can be provided that before a shift operation the pressure medium demand is estimated and then, for the duration of the shift process, if the pressure medium demand is high a plurality of main shut-off valves are opened, whereas if the demand is low only one of the main shut-off valves, or only some of the main shut-off valves are opened.

In the case of shift operations requiring the opening of only one, or only some of the main shut-off valves, to avoid premature wear of one of the valves it is expedient, over several such shift operations, to use all the main shut-off valves in rotation in a predetermined sequence.

In this it should be borne in mind that premature wear of one of the main shut-off valves can take place both with above-average use due to frictional wear on seals and sealing surfaces, and with below-average use, i.e. long periods of inactivity, if seals stick to sealing surfaces and are torn apart when operation resumes. Both types of wear can be minimized by using all the main shut-off valves statistically with approximately the same frequency and in about the same distribution, and this also prolongs the life of the control device as a whole.

As an alternative to the above procedure it is also possible at first to open only one of the main shut-off valves at the beginning of a shift operation, determine the pressure p_dls and/or the pressure gradient (dp/dt)_dls in the pressure line during the shift operation by means of a pressure sensor connected to the pressure line, and if the pressure p_dls detected falls below a predetermined minimum value p_min and/or the pressure gradient (dp/dt)_dis detected falls below a predetermined minimum value (dp/dt)_min, to open further main shut-off valves one at a time in succession until the minimum pressure p_min and/or the minimum pressure gradient (dp/dt)_min in the pressure line has or have been reached or exceeded.

In shift operations with such sequential opening of the main shut-off valves as well, premature wear of one of the main shut-off valves can be avoided if, over a number of such shift operations, all the main shut-off valves are used in rotation in a predetermined sequence, i.e. in each case a different main shut-off valve is opened first.

Furthermore, it is advantageous for malfunctions of the main shut-off valves to be diagnosed, and if a fault is detected in one of them, then for only the fault-free main shut-off valves to be controlled and actuated. This can avoid malfunctions due to an undefined condition of the faulty main shut-off valve.

BRIEF DESCRIPTION OF THE DRAWINGS

To clarify the invention the description is attached of a drawing which shows.

DETAILED DESCRIPTION OF THE PREFERRED EMBODIMENTS

Figure 1:
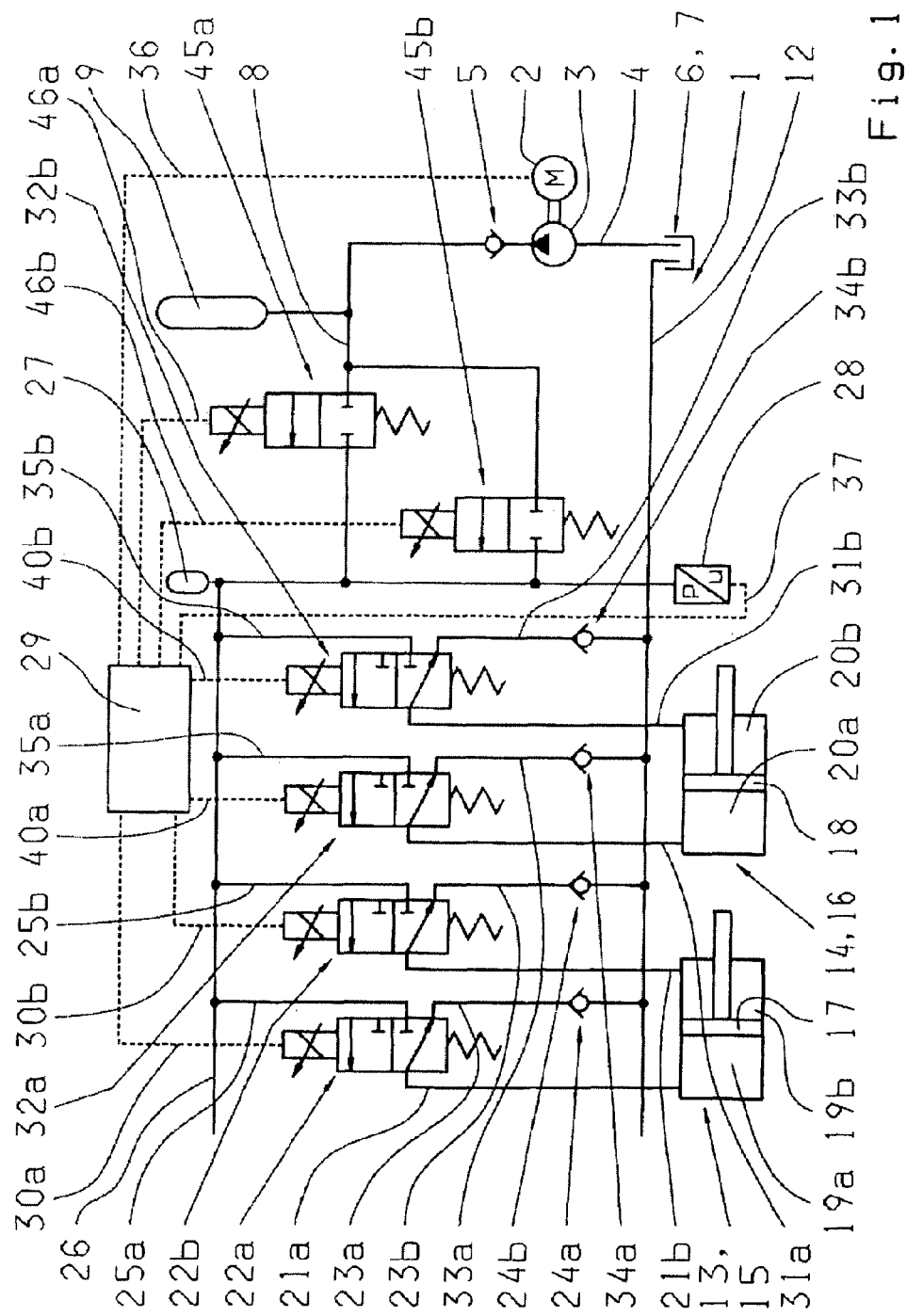
FIG. 1 Schematic view of a control device according to the invention.
Figure 2:
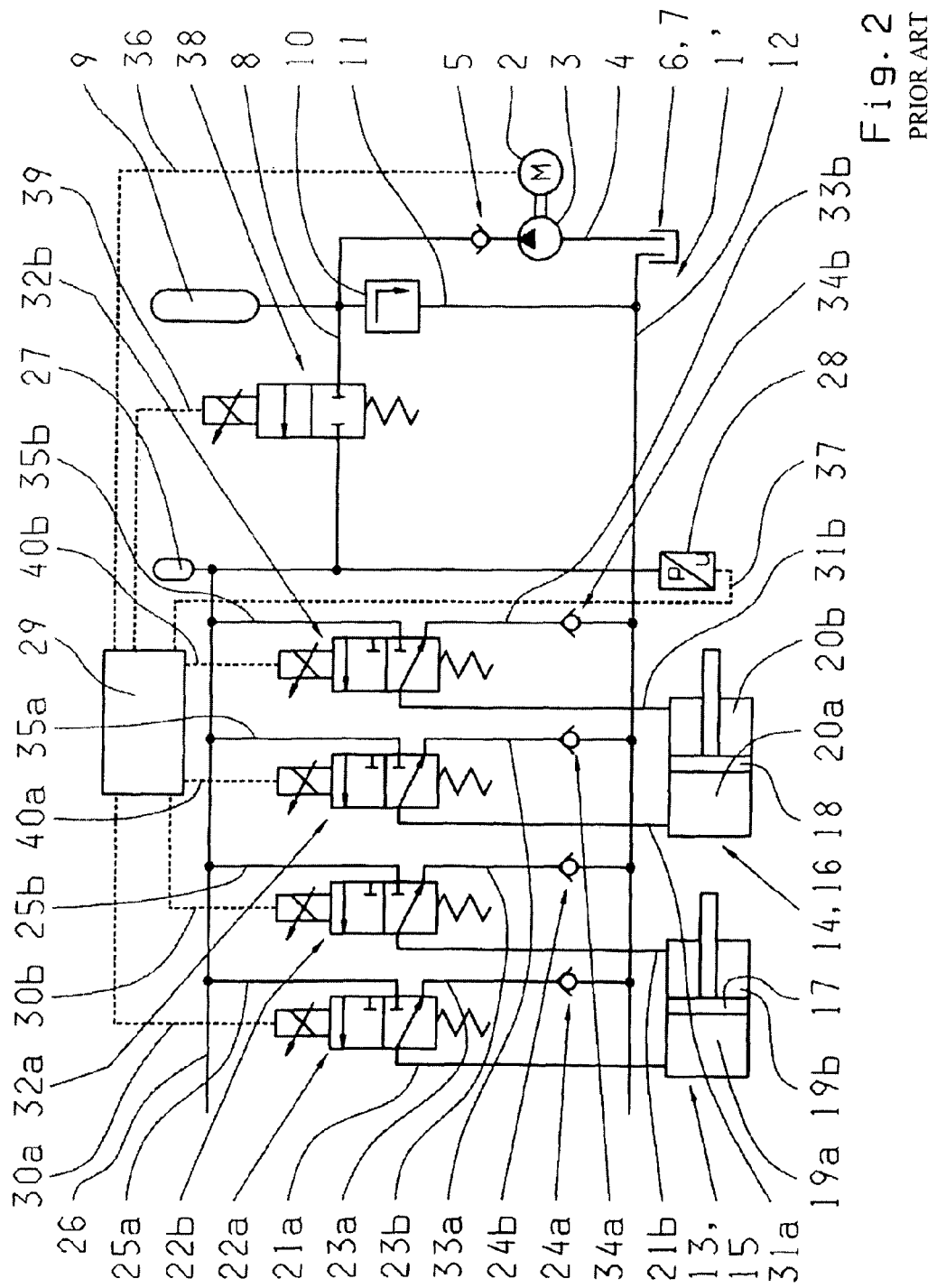
FIG. 2: Schematic view of a first control device according to the prior art.
Figure 3:
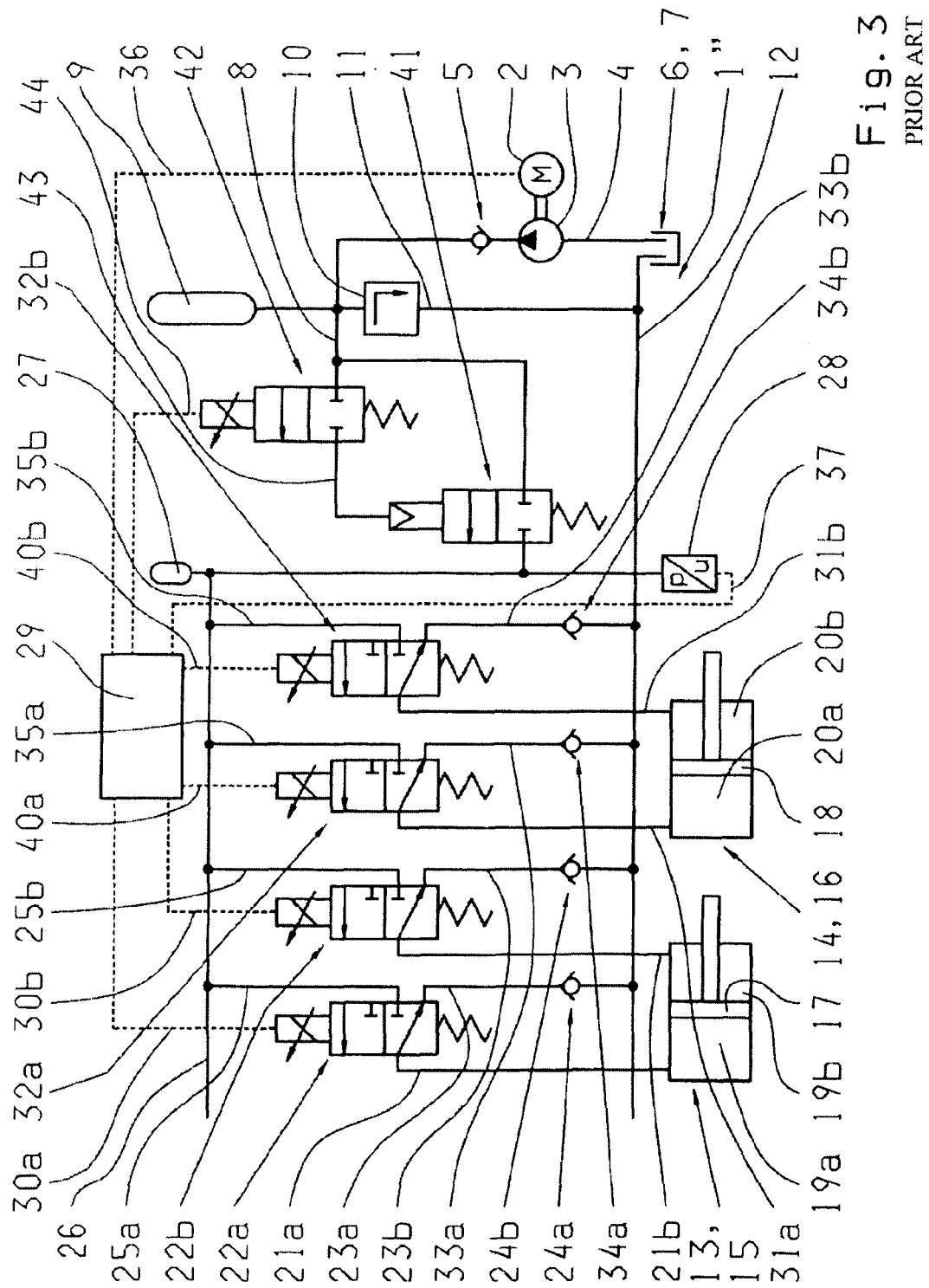
FIG. 3: Schematic view of a known, second control device.

FIGS. 1, 2 and 3 show respective hydraulic or pneumatic control devices 1, 1', 1" of an automated shift transmission of a motor vehicle, with the following features in common:

By means of a pump 3 driven by a motor 2, a pressure medium such as hydraulic oil or compressed air can be delivered via a suction line 4 and a one-way valve 5 from a storage container 6 or oil sump 7 to a main pressure line 8. To compensate for pressure fluctuations, a pressure reservoir 9 is connected to the main pressure line 8.

The control devices 1, 1', 1" comprise a plurality of actuating devices, of which in FIGS. 1, 2 and 3 only two actuating devices 13 and 14 are shown. The actuating devices 13 and 14 which, depending on the type of structure of the transmission-internal shift actuation system, may be either a selector control element and a gearshift control element, or only gearshift control elements, are in each case made as a double-action actuating cylinder 15, 16 each of which comprises two pressure spaces 19a, 19b and 20a, 20b respectively, separated by respective pistons 17, 18.

The pressure spaces 19a, 19b of the first actuating device 13 are each connected by a connection line 21a, 21b to the respective outlet of a control valve 22a, 22b made as a 3/2-way magnetic switching valve. By means of the associated first control valve 22a the first pressure space 19a of the first actuating device 13 can be connected selectively, via a return-flow line 23a and a one-way valve 24a, to the unpressurized line 12 or, via a flow inlet line 25a, to a pressure line 26. In a similar fashion the second pressure space 1 9b of the first actuating device 13 can be connected selectively, via a return-flow line 23b and a one-way valve 24b, to the unpressurized line 12 or, via a flow inlet line 25b, to the pressure line 26.

In the same way the pressure spaces 20a and 20b of the second actuating device 14 are each connected by a connection line 31a, 31b to the outlet of a control device 32a, 32b made as a 3/2-way magnetic switching valve. By means of the associated first control valve 32a the first pressure space 20a of the second actuating device 14 can be connected selectively, via a return-flow line 33a and a one-way valve 34a, to the unpressurized line 12 or, via a flow inlet line 35a, to the pressure line 26. In a similar fashion the second pressure space 20b of the second actuating device 14 can be connected selectively, via a return-flow line 33b and a one-way valve 34b, to the unpressurized line 12 or, via a flow inlet line 35b, to the pressure line 26.

To compensate for pressure fluctuations, a pressure reservoir 27 is connected to the pressure line 26. In addition a pressure sensor 28 is connected to the pressure line 26, which sensor, as also provided in DE 199 31 973 A1, can be used for the measurement, or as in DE 101 31 853 A1, for the computerized determination of the actuation pressures in the respective pressure spaces 19a, 19b and 20a, 20b of the actuating devices 13 and 14.

Furthermore, a preferably electronically designed control unit 29 is provided, which is connected via electric control lines 30a, 30b, 40a, 40b to the control valves 21a, 21b, 31a, 31b of the actuating devices, via another electric control line 39 to the motor 2, and via an electric sensor line 37 to the pressure sensor 28.

In an embodiment of the control device 1' according to FIG. 2, known in principle from DE 199 31 973 A1 and DE 101 31 853 A1, a single main shut-off valve 38 is arranged between the main pressure line 8 and the pressure line 26. The main shut-off valve 38 is made as a 2/2-way magnetic switching valve and is connected to the control unit 29 by an electric control line 39.

The purpose of the main shut-off valve 38, in order to avoid leakage loss, is to cut off the control valves 22a, 22b, 32a, 32b connected to the pressure line 26 from the main pressure line 8 when shift operations are not taking place, and to connect them to the main pressure line 8 during shift operations so that they are supplied with sufficient pressure and volume flow for the actuation of the actuating devices 13 and 14. Since in this case there is only a single main shut-off valve 38, this is designed for the maximum possible pressure medium demand of the actuating devices 13, 14 and is therefore of relatively large size, which results in relatively poor control properties such as delayed response behavior and the need for a large control current, relatively high component costs, and in most shift operations unnecessarily high mechanical loading of the control valves 22a, 22b, 32a, 32b. In addition, a malfunction of the main shut-off valve 38 can cause the failure of the control system 1' as a whole.

To limit the main pressure, the main pressure line 8 is connected, via a pressure-limiting valve 10 and a return-flow line 11, to an unpressurized line 12 which leads to the storage container 6 or oil sump 7.

In another known embodiment of the control device 1" shown in FIG. 3, again a single main shut-off valve 41 is arranged between the main pressure line 8 and the pressure line 26, but in contrast to the design shown in FIG. 2, this is now in the form of a pressure-controlled 2/2-way switching valve. To actuate the main shut-off valve 41 an interposed switching valve 42 is provided, which is made as a 2/2-way magnetic switching valve whose inlet is connected to the main pressure line 8 and whose outlet is connected via a pressure control line 43 to the control inlet of the main shut-off valve 41, and which is connected by an electric control line 44 to the control unit 29.

The magnetic switching valve acting as the interposed switching valve 42 is substantially smaller than the main shut-off valve 38 of the embodiment in FIG. 2 described earlier, so that the control properties and reliability of the magnetic switching valve 42 are better. On the other hand, no cost advantage and no improvement of operational reliability are achieved by the conjoint use of the two switching valves 41 and 42.

In contrast to the known versions according to FIGS. 2 and 3 described above, in the control device 1 according to the invention shown in FIG. 1 a plurality of, for example two main shut-off valves 45a, 45b are connected in parallel between the main pressure line 8 and the pressure line 26. The main shut-off valves 45a and 45b are in each case made as a 2/2-way magnetic switching valve and are each connected by respective electric control lines 46a, 46b to the control unit 29, so that they can be actuated independently of one another.

Expediently, the main shut-off valves 45a, 45b are of relatively small size, which results in better response behavior. In addition the main shut-off valves 45a, 45b are preferably of identical structure and are designed such that a smaller pressure medium demand by the actuating devices 13, 14 can be covered by opening only one of them (45a or 45b) and a larger pressure medium demand by the actuating devices 13,14 can be covered by opening both main shut-off valves 45a 45b. This enables the main shut-off valves 45a, 45b to be controlled according to need, so that the mechanical loading of the control valves 22a, 22b, 32a, 32b and leakage losses during the shift process are substantially reduced.

For control according to need the pressure sensor 28 can also be used, so that during shift phases the main shut-off valves 45a, 45b can be opened in sequence as a function of the pressure $p\_dls$ and/or the pressure gradient $(dp/dt)\_dls$ in the pressure line 26.

If one of the main shut-off valves 45a or 45b fails, then the functionality of the control device 1 is preserved by virtue of the fault-free main shut-off valve 45b or 45a, even though with reduced dynamics, i.e. longer shifting times in the shift transmission. Thus, compared with the known designs, the operational reliability of the control device 1 according to the invention is substantially improved by the parallel connection of a plurality of main shut-off valves 45a, 45b.

INDEXES

1 Control device
1' Control device
1" Control device
2 Motor
3 Pump
4 Suction line
5 One-way valve
6 Storage reservoir
7 Oil sump
8 Main pressure line
9 Pressure reservoir
10 Pressure-limiting valve
11 Return-flow line
12 Unpressurized line
13 Actuating device
14 Actuating device
15 Double-action actuating cylinder
16 Double-action actuating cylinder
17 Piston
18 Piston
19a Pressure space
19b Pressure space
20a Pressure space
20b Pressure space
21a Connection line
21b Connection line
22a Control valve
22b Control valve
23a Return-flow line
23b Return-flow line
24a One-way valve
24b One-way valve
25a Inlet line
25b Inlet line
26 Pressure line
27 Pressure reservoir
28 pressure sensor
29 Control unit
30a Control line
30b Control line
31a Connection line
31b Connection line
32a Control valve
32b Control valve
33a Return-flow line
33b Return-flow line
34a One-way valve
34b One-way valve
35a Inlet line
35b Inlet line
36 Control line
37 Sensor line
38 Main shut-off valve
39 Control line
40a Control line
40b Control line
41 Main shut-off valve
42 Interposed control line
43 Pressure control line
44 Control line
45a Main shut-off valve
45b Main shut-off valve
46a Control line
46b Control line

The invention claimed is:

1. A method for actuating control elements in one of a hydraulic or pneumatic control device (1) of an automated shift transmission, which comprises actuating devices with actuating cylinders (15, 16) having pressure spaces (19a, 19b; 20a, 20b), a respective control valve (22a, 22b; 32a, 32b) connecting the pressure spaces (19a, 19b; 20a, 20b) to an intermediate pressure line (26) which is one of selectively, by main shut-off valves (45a, 45b), connected to or cut off from a main pressure line (8), the method comprising the steps of:

determining a pressure medium demand of the actuating devices (13, 14) and the respective control valves (22a, 22b; 32a, 32b) with a plurality of main shut-off valves (45a, 45b) which are arranged in parallel between the main pressure line (8) and the intermediate pressure line (26);

actuating the main shut-off valves (45a, 45b) depending on the determined pressure medium demand; and estimating the pressure medium demand before a shift operation and thereafter for a duration of the shift process, and if the pressure medium demand is high, then a first a plurality of main shut-off valves (45a, 45b) are opened, and if the pressure medium demand is low, then only one of the plurality of main shut-off valves (45a or 45b) is opened.

2. The method according to claim 1, further comprising the step of sequentially actuating the main shut-off valves (45a, 45b) over a plurality of shift operations when only one of the plurality of main shut-off valves (45a or 45b) is opened during each shift operation.

3. The method according to claim 1, further comprising the steps of:

opening only one of the main shut-off valves (45a or 45b) at a beginning of a shift operation;

detecting, during the shift operation, by a pressure sensor (28) connected to the intermediate pressure line (26) at least one of a pressure (p_dls) and a pressure gradient ((dp/dt)_dls) in the intermediate pressure line (26);

successively opening another of the main shut-off valves (45b or 45a), if the at least one of the detected pressure (p_dls) falls below a predetermined minimum pressure (p_min) and the pressure gradient ((dp/dt)_dls) falls below a predetermined minimum pressure gradient ((dp/dt)_min), until the at least one of the detected pressure (p_dls) and the pressure gradient ((dp/dt)_dls) in the pressure line (26) one of equals or exceeds the respective one of the predetermined minimum pressure (p_min) and the predetermined minimum pressure gradient ((dp/dt)_min).

4. The method according to claim 3, further comprising the step of opening all the main shut-off valves (45a, 45b) in a predetermined sequence if the main shut-off valves (45a, 45b) are opened during the shift operation in succession, over a number of such shift operations.

5. The method according to claim 1, further comprising the step of monitoring the main shut-off valves (45a, 45b) for failure, and only actuating a fault free main shut-off valve (45b or 45a) if a fault is recognized in one of the main shut-off valves (45a or 45b).

6. The method according to claim 1, wherein the hydraulic or pneumatic control device comprising a control unit (29) with means suitable for carrying out the method, and the method further comprising:

actuating devices with actuating cylinders (15, 16) having pressure spaces (19a, 19b; 20a, 20b);

a respective control valve (22*a*, 22*b*; 32*a*, 32*b*) connecting the pressure spaces (19*a*, 19*b*; 20*a*, 20*b*) to an intermediate pressure line (26) which is, by a first main shut-off valve (45*a*) one of selectively connected to or cut off from a main pressure line (8);

at least one second main shut-off valve (45*b*) being arranged in parallel with the first main shut-off valve (45*a*), between the main pressure line (8) and the intermediate pressure line (26), and the at least one second main shut-off valve (45*b*) being actuatable between on and off; and the first and the at least one second main shut-off valves (45*a*, 45*b*) being sized to provide a maximum possible pressure medium demand when each of the first and the at least one second main shut-off valves (45*a*, 45*b*) are open, while a smaller pressure medium demand being provided by opening only a single one of the first and the at least one second main shut-off valves (45*a* or 45*b*).

7. The method according to claim 6, wherein all of the first and the at least one second main shut-off valves (45*a*, 45*b*) are 2/2-way magnetic switching valves.

8. The method according to claim 6, wherein all of the first and the at least one second main shut-off valves (45*a*, 45*b*) have identical structures.

9. The method according to claim 6, wherein the first and the at least one second main shut-off valves (45*a*, 45*b*) are controlled independently of one another by the control unit (29).

10. The method according to claim 9, wherein a pressure sensor (28) is connected to the intermediate pressure line (26) to facilitate control of the main shut-off valves (45*a*, 45*b*), and the pressure sensor (28) determines at least one of a pressure ($p\_dls$) and a pressure gradient ($(dp/dt)\_dls$) in the intermediate pressure line (26).

* * * * *